(No Model.) 5 Sheets—Sheet 1.
A. L. STEVENS.
LABELING MACHINE.
No. 517,896. Patented Apr. 10, 1894.
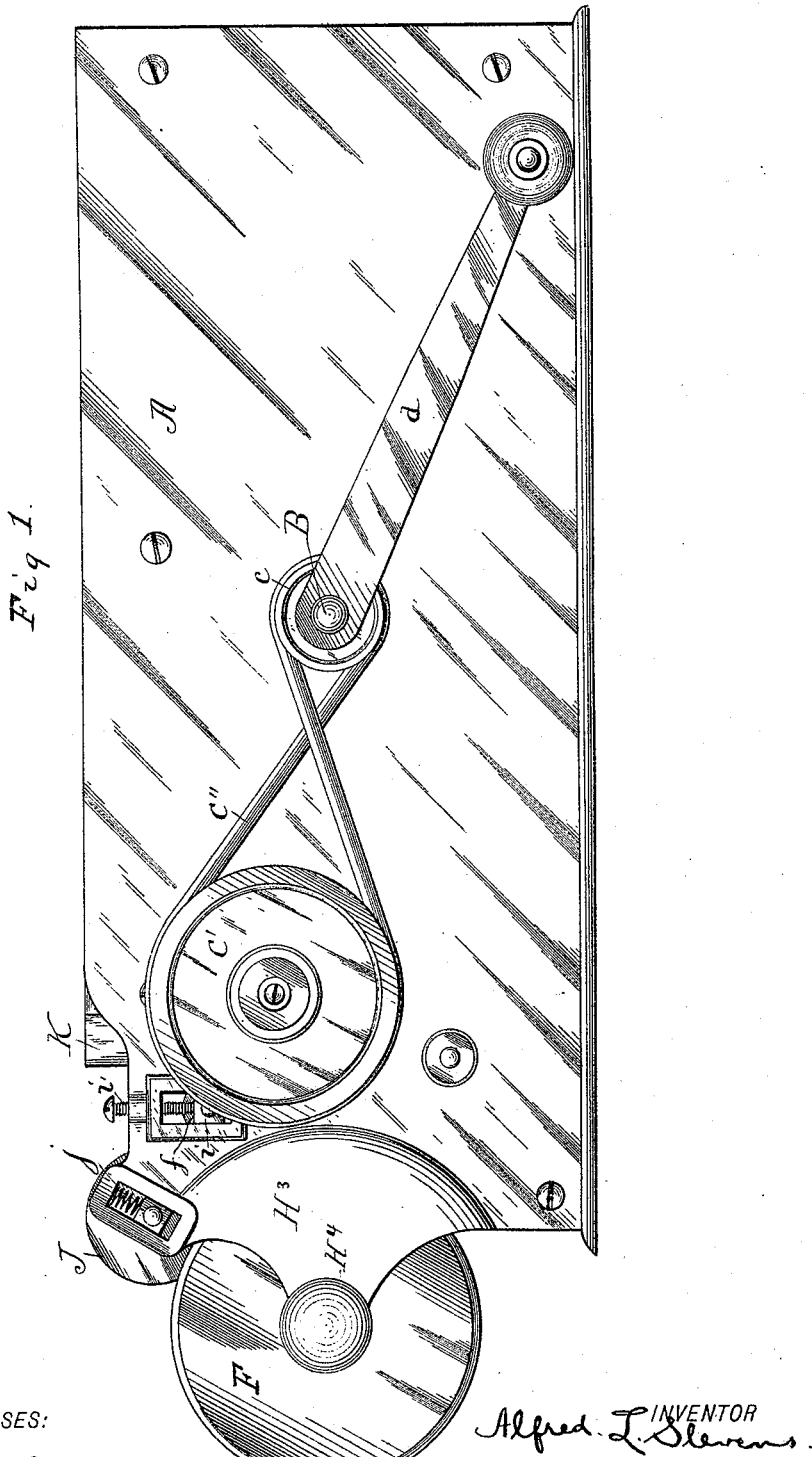
WITNESSES:
L. C. Leoty.
R. C. Douthitt.
INVENTOR
Alfred L. Stevens.
BY
Toulmin & McCarty
ATTORNEYS
THE NATIONAL LITHOGRAPHING COMPANY,
WASHINGTON, D. C.

(No Model.)  5 Sheets—Sheet 2.
A. L. STEVENS.
LABELING MACHINE.
No. 517,896.  Patented Apr. 10, 1894.
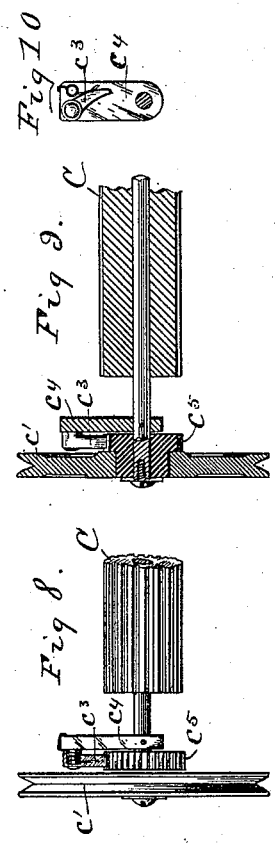
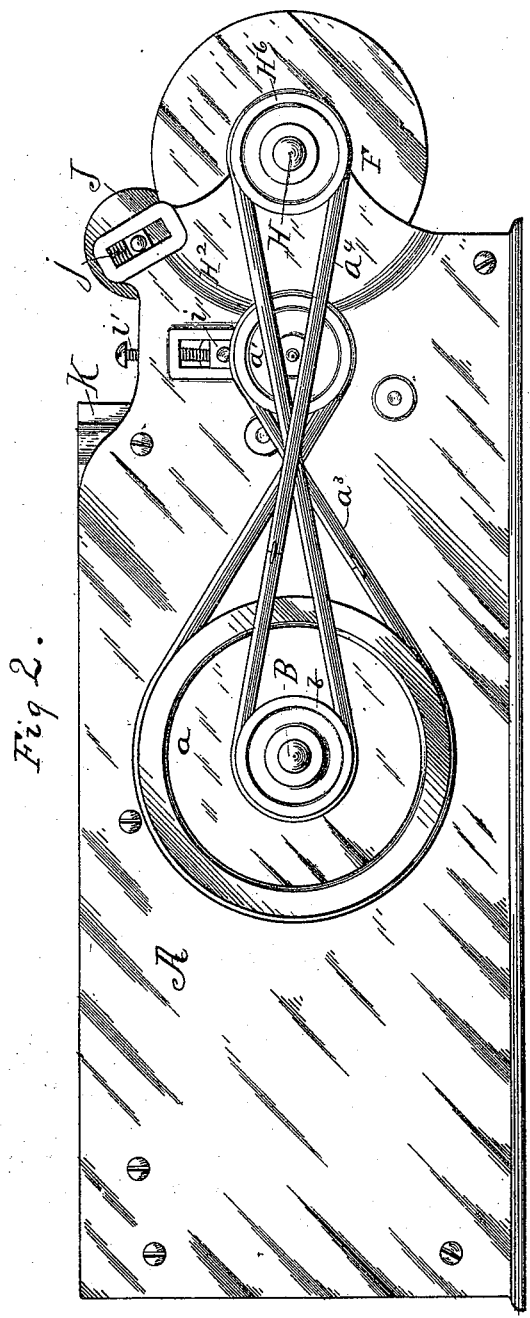
WITNESSES:
L. C. Leoty.
R. C. Douthitt.
INVENTOR
Alfred. L. Stevens.
BY
Toulmin & McCarty
ATTORNEYS (No Model.) 5 Sheets—Sheet 3.
A. L. STEVENS.
LABELING MACHINE.
No. 517,896. Patented Apr. 10, 1894.
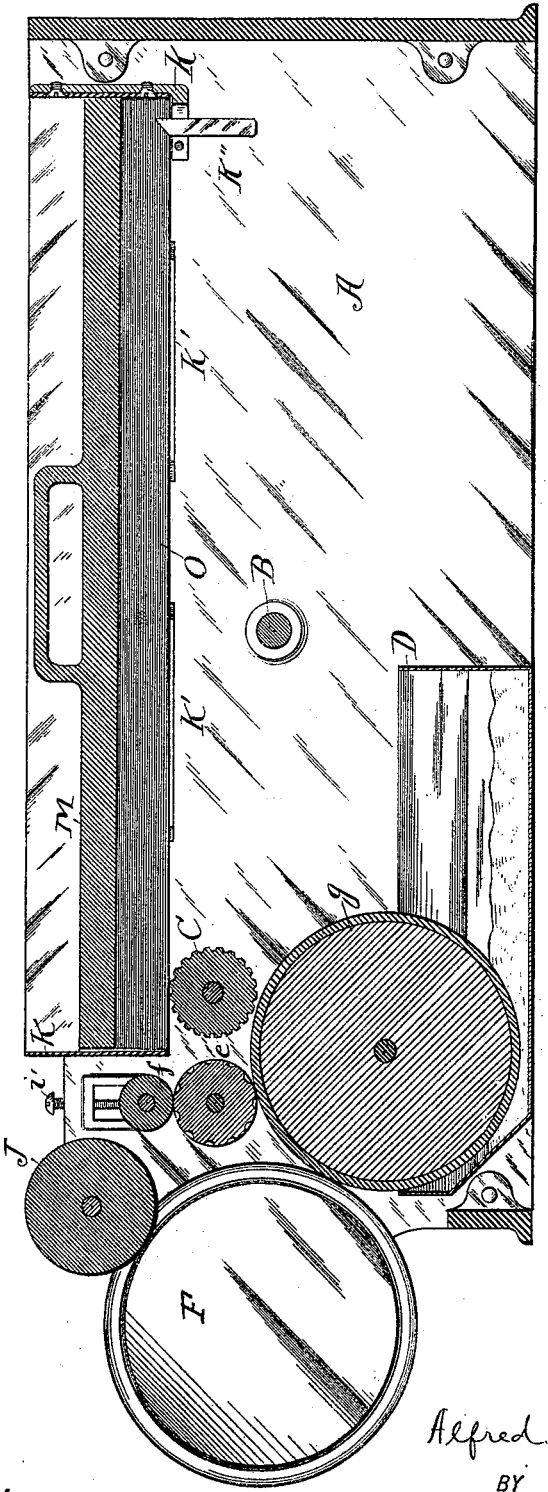
WITNESSES:
L. E. Leoty.
R. C. Douthitt.
INVENTOR
Alfred L. Stevens.
BY
Toulmin & McCarty.
ATTORNEYS

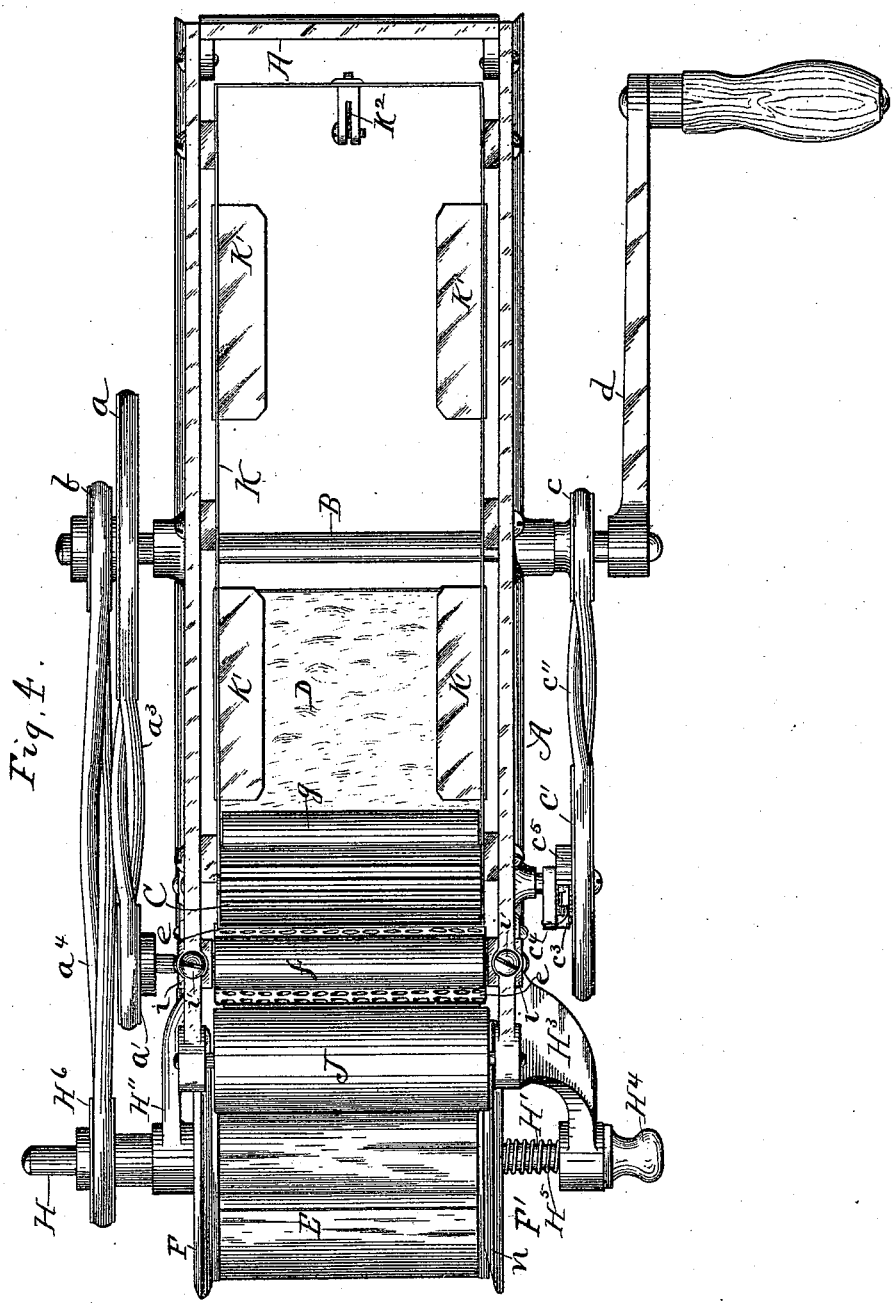

(No Model.) 5 Sheets—Sheet 5.
A. L. STEVENS.
LABELING MACHINE.
No. 517,896. Patented Apr. 10, 1894.
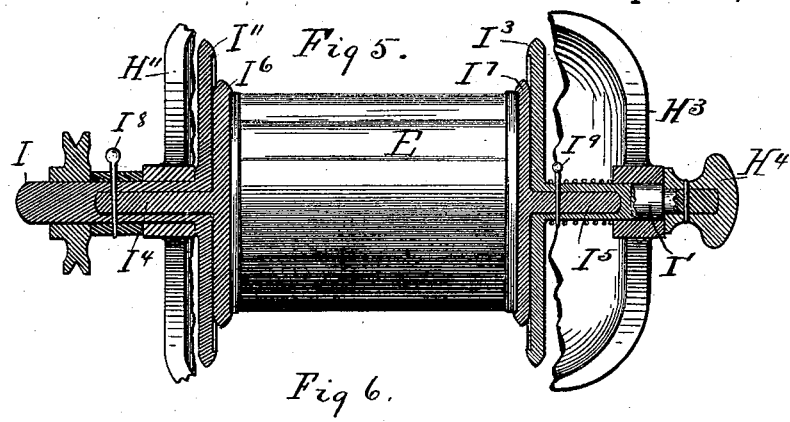
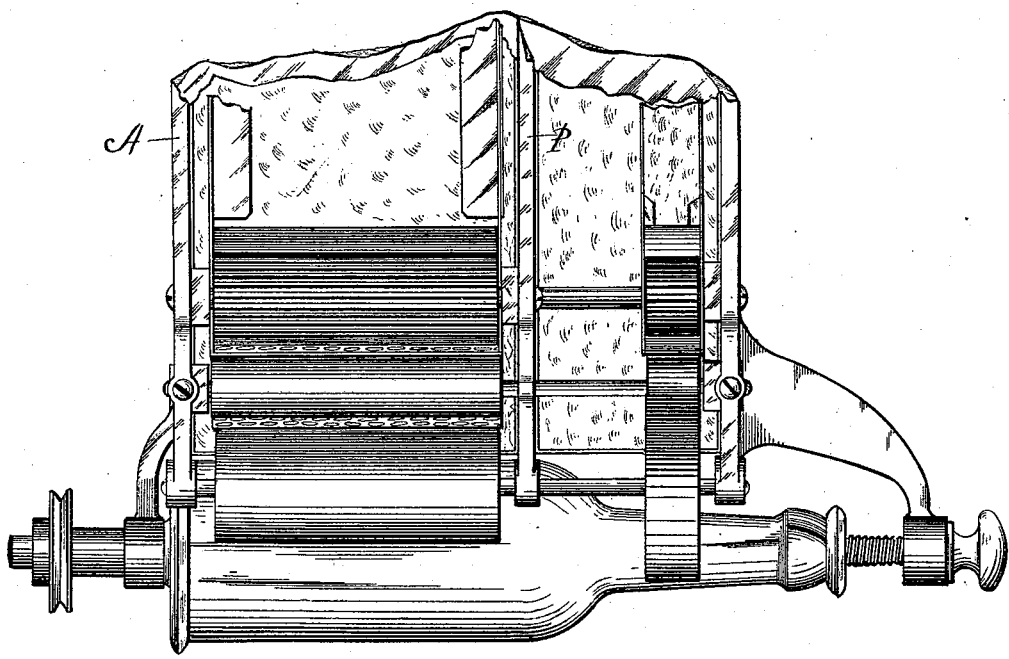
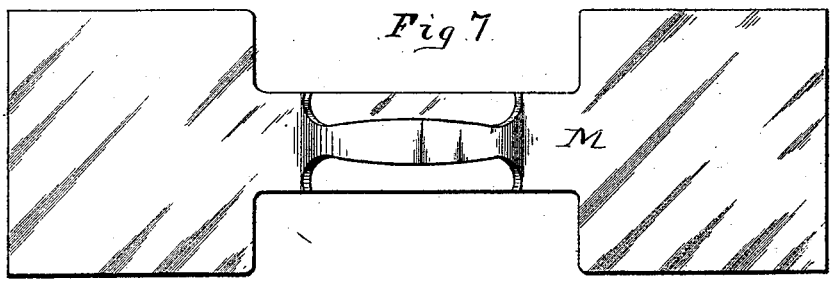
WITNESSES:
INVENTOR
Alfred L. Stevens.
BY
Toulmin & McCarty
ATTORNEYS
THE NATIONAL LITHOGRAPHING COMPANY,
WASHINGTON, D. C.

UNITED STATES PATENT OFFICE.

ALFRED L. STEVENS, OF DAYTON, OHIO, ASSIGNOR OF TWO-THIRDS TO JNO. M. PHELPS AND CHRISTOPHER W. UTHBROK, OF SAME PLACE.

LABELING-MACHINE.

SPECIFICATION forming part of Letters Patent No. 517,896, dated April 10, 1894.

Application filed April 17, 1893. Serial No. 470,795. (No model.)

*To all whom it may concern:*

Be it known that I, ALFRED L. STEVENS, of Dayton, county of Montgomery, State of Ohio, have invented a new and useful Improvement in Labeling-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention, which relates to improvements in labeling machines, is to provide simplified and improved mechanical means for applying labels to articles, such as cans, bottles and like receptacles of cylindrical form, in a speedy and efficient manner; to this end, the said improvements consist of paste and label receptacles, paste-applying rollers, one of which is provided with a recessed surface, a feeding roller having a corrugated or roughened surface, and a pressure roller having a cushion surface, and other conjoint elements constructed, combined and arranged so as to accurately feed a label from a package, to the paste-applying mechanism, thence to the surface of the can or bottle, upon which it is neatly and securely pasted, all of which will be fully described in the specification and portrayed in the drawings, upon which the same characters of reference will be used to indicate corresponding parts in the several views.

Figure 1. is a side elevation of my improved labeling machine; Fig. 2. a similar elevation of the opposite side to that shown in Fig. 1; Fig. 3. a longitudinal section; Fig. 4. a plan view, showing the label receptacle empty; Fig. 5. a detail, detached view of a modified form of the can support, the same adapted to hold cans of varying sizes. The disks appear in section. Fig. 6. is a modified construction for labeling the body and neck of a bottle simultaneously, by the one operation; Fig. 7. a detached, detail view of the label-weight; Fig. 8. a detached, detail view of the corrugated feed roller, broken off, the shaft thereof, pulley, ratchet and detent; Fig. 9. a detached, detail sectional view of the same; Fig. 10. a detached, detail view of the ratchet detent.

The letter A indicates the casing or housing in which are inclosed and supported, the various mechanical elements embodied in my invention. The casing is preferably constructed of metal, and designed in a manner to best accommodate the parts.

B indicates the driving shaft suitably journaled in the side of said casing; having pulleys, $a$ and $b$, fixed thereto on one side, and pulley $c$ and hand crank $d$ fixed thereto, on the opposite side.

C indicates the primary feeding roller, provided with a corrugated surface to readily bring forth a label and convey the same to the combined paste-applying and feeding rollers $e$ and $f$, the former of which is provided with a recessed periphery, which serves, in a measure, as a reservoir to retain a certain amount of paste thereon, thereby insuring the application of a requisite amount of paste to the label; further reference will be hereinafter made to these rollers.

Returning to the primary feed roller C, $c'$ is a pulley fixed to the hub of ratchet wheel $c^5$, which parts are loosely mounted on the shaft of roller C, the pulley $c'$ being connected with pulley $c$ by a belt $c''$. $c^4$ is an arm fixed to the shaft of roller C to which a spring retaining pawl $c^3$ is pivoted so as to permit said pawl to engage with the ratchet wheel $c^5$. The function of this ratchet mechanism is to enable an attachment of pulley $c'$ loosely on the shaft of the feed roller C, and thereby avoid the backward turning of said roller; the forward turning of said pulley, it will be understood rotates said roller by means of the ratchet mechanism. The recessed roller $e$, is provided with a pulley $a'$ fixed to its shaft, which pulley has an operative connection through the medium of belt $a^3$ with the main pulley $a$; beneath this recessed roller, is the primary paste-applying roller $g$, with its shaft mounted in the casing in a similar manner to the rollers just described, and having a contact with roller $e$ by which it is rotated.

A paste receptacle D is located in the bottom of the casing in a position to permit the paste-applying roller $g$ to come in contact with the paste therein as the said roller is rotated. This paste-applying roller, it will be seen, is of a greater diameter than any of the rollers shown or described; the object of such a construction is to present a broad circumferential surface from which the paste-applying roller $e$ obtains its supply, and also to provide a roller that extends a desirable distance into the paste receptacle, which obviates the necessity of a frequent replenishment of said receptacle.

Immediately above roller $e$, a frictional roller $f$ is placed, having its journals mounted in adjustable bearings in the sides of the casing, consisting of boxes $i—i$; the necessary pressure for a proper adjustment of this roller with reference to its contact with roller $e$, is effected by the set screws $i'—i'$, so that the label is issued directly from the roller and placed in a proper position on the can. It will be understood that a proper presentation of the label by these rollers, is one that prevents the label from curling up or dropping down before it reaches the can, and this depends upon a proper adjustment of said rollers. Any permanent adjustment would prove defective, in time, by reason of the wear incident to the operation of the mechanism; also, by providing the adjustable bearings for roller $f$, labels of various thicknesses may be properly manipulated by this machine. The can E or other article to be labeled, see Fig. 4 is supported between disks F and F' which are fixed to shafts H and H' provided with bearings in extensions H'' and $H^3$ in the front of the casing; these disks have circumferential flanges or rings, $n—n$, extending laterally from the inner faces thereof, by means of which, the article to be labeled is prevented from slipping from the support. To admit of easy removal of a can from this support and the insertion of another, I provide shaft H' of disks F' with a bearing in which it may be moved horizontally by drawing upon the knob $H^4$; a spiral spring $H^5$ encircles shaft H' and exerts a normal pressure of the disk F' against the can, with sufficient compactness of these parts, to compel their rotation when motion is given pulley $H^6$ on disk shaft H through the medium of a belt $a^4$ and pulley $b$ on main shaft B.

As a means of applying a requisite amount of pressure to the label as the can is being revolved with the rotating support I provide a pressure roller J adapted to normally rest upon the periphery of the can and be maintained there-against by springs $j—j$ pressing against the journals of said roller; the surface of this roller is preferably cushioned as best adapted for the purposes thereof.

K represents the label receptacle which may be removably or permanently placed in the casing, and a receptacle of smaller may be fitted in one of larger dimensions, and thereby the machine be adapted to manipulate labels of various sizes.

K' represents lateral extensions or ledges projecting from the bottom of the receptacle, upon which labels O have a support. This receptacle is so placed in the casing that the front end of the bottom label rests upon the corrugated surface of the feeding roller C and is positively acted upon by said roller and carried forward when the mechanism is operated; as an effective means of preventing the feeding of more than a single label at a time, I provide a blade K'' placed vertically in the rear center of the label receptacle, so that the point thereof penetrates a sufficient number of the labels to prevent any number of them being moved in a body, while it does not retard their movement singly. I place a gravity weight M upon top of the labels to insure a proper pressure of said labels against this blade, and also against the feeding roller C.

Fig. 5, of the drawings shows a modification of the can support which has for its object the adaptation of the support to cans of different diameters, this utility is accomplished by constructing the shafts I and I' of disks $I^2$ and $I^3$ with longitudinal bores in which stems $I^4$ and $I^5$ of disks $I^6$ and $I^7$ are socketed and secured by pins $I^8$ and $I^9$ all as appears in Fig. 5.

To those skilled in the art to which my invention appertains, it is manifest that some modifications may be made in its structural features, and that a label may be applied to an article having different diameters, such for instance, as the body and neck of a bottle as is shown in Fig. 6. In this application of the device the casing is provided with a longitudinal portion P and with two sets of rollers similar to those hereinbefore described, one set to manipulate the label with reference to the body while the other set applies a label to the neck of the bottle, all substantially as described in the foregoing specification; it is further apparent that the machine may be driven by any of the well known power transmitting mediums; it is thought preferable to employ a train of gearing extending from the driving shaft to the feeding and paste-applying rollers, although in the drawings I have shown the belt and pulley.

I am aware that it is not new to support a can while being labeled, between a pair of rimmed disks, therefore it is not my desire to claim beyond the construction shown in Fig. 5.

Having described my invention, I desire to secure by Letters Patent—

1. In a labeling machine, the combination with the casing provided with a paste receptacle and a driving shaft; of a label receptacle placed longitudinally in said casing, the blade K'' secured vertically in the rear center of said receptacle, a primary feeding roller journaled in the front portion of the casing below the label receptacle so that the labels rest upon said feeding roller, the rollers $g$, $e$, and $f$ through which paste is applied to the labels, and said labels are fed to the can, the gravity weight to insure a proper contact of said labels with the blade K'' and the primary feeding roller, substantially as and for the purposes specified.

2. The combination in a labeling machine, of a label holder, the blade $K^2$ attached to a slotted arm projecting horizontally from the rear of the label holder, the feed roller C, the pulley $c'$ and ratchet wheel $c^5$ loosely mounted on the shaft of roller C, and the pawl $c^3$ pivoted to the arm $c^4$ rigidly mounted on said shaft, the feed rollers $e$ and $f$ mounted adjacent to roller C to receive the label from the latter roller, the paste roller $g$ to feed paste to the label, substantially as described.

3. In a labeling machine, an adjustable can holder consisting of the disks $I^2$ and $I^3$ having journals with longitudinal bores therein mounted in the casing, the disks $I^6$ and $I^7$ with bearing stems adapted to be inserted in said bores, and means for rigidly securing said stems when so inserted, whereby means for supporting cans of various sizes are provided.

In testimony whereof I have hereunto set my hand this 3d day of April, 1893.

ALFRED L. STEVENS.

Witnesses:
JOHN M. SPRIGG,
R. JAY MCCARTY.